US010783176B2

(12) United States Patent
Wigtil

(10) Patent No.: US 10,783,176 B2
(45) Date of Patent: Sep. 22, 2020

(54) ENHANCED ITEM DEVELOPMENT USING AUTOMATED KNOWLEDGEBASE SEARCH

(71) Applicant: Pearson Education, Inc., New York, NY (US)

(72) Inventor: Clifton Joel Wigtil, San Antonio, TX (US)

(73) Assignee: Pearson Education, Inc., New York, NY (US)

( * ) Notice: Subject to any disclaimer, the term of this patent is extended or adjusted under 35 U.S.C. 154(b) by 354 days.

(21) Appl. No.: 15/937,710

(22) Filed: Mar. 27, 2018

(65) Prior Publication Data

US 2019/0303497 A1    Oct. 3, 2019

(51) Int. Cl.
| | | |
|---|---|---|
| *G06F 16/00* | (2019.01) | |
| *G06F 16/33* | (2019.01) | |
| *G06F 16/338* | (2019.01) | |
| *G06F 16/35* | (2019.01) | |
| *G06F 16/951* | (2019.01) | |

(52) U.S. Cl.
CPC .......... *G06F 16/334* (2019.01); *G06F 16/338* (2019.01); *G06F 16/353* (2019.01); *G06F 16/951* (2019.01)

(58) Field of Classification Search
CPC .. G06F 16/338; G06F 16/951; G06F 16/3329; G06F 16/353; G06F 16/334
See application file for complete search history.

(56) References Cited

U.S. PATENT DOCUMENTS

| | | | | |
|---|---|---|---|---|
| 4,905,163 A | * | 2/1990 | Garber | G06F 16/217 |
| | | | | 706/55 |
| 4,930,071 A | * | 5/1990 | Tou | G06N 5/02 |
| 10,606,850 B2 | * | 3/2020 | Crudele | G06F 40/279 |
| 2005/0108200 A1 | * | 5/2005 | Meik | G06F 16/355 |
| 2007/0233656 A1 | * | 10/2007 | Bunescu | G06F 40/295 |
| 2016/0004752 A1 | * | 1/2016 | Zlamany | G06F 16/2228 |
| | | | | 707/725 |

* cited by examiner

*Primary Examiner* — Cheryl Lewis
(74) *Attorney, Agent, or Firm* — Quarles & Brady LLP

(57) ABSTRACT

Systems and methods of the present invention provide for: selecting a word pair and a category, concept, or sample response from a data store; performing a data extraction on a first knowledge base, including an article or content associated with a word in the word pair or a list of articles linking to the category, concept, or sample response; inserting words generated from the data extraction into a data store; defining a difficulty level for each of the words according to a crawl of difficulty data in a second knowledge base; and rendering a GUI displaying the words and the difficulty level for each of the words.

20 Claims, 6 Drawing Sheets

---

File Edit Tools

Item Development Dashboard

Knowledge Base: Child

Biologically, a child (plural: children) is a human being between the stages of birth and puberty. The legal definition of child generally refers to a minor, otherwise known as a person younger than the age of majority.

Child may also describe a relationship with a parent (such as sons and daughters of any age)[3] or, metaphorically, an authority figure, or signify group membership in a clan, tribe, or religion; it can also signify being strongly affected by a specific time, place, or circumstance, as in "a child of nature" or "a child of the Sixties".[4]

There are many social issues that affect children, such as childhood education, bullying, child poverty, dysfunctional families, child labor, hunger, and child homelessness. Children can be raised by parents, by fosterers, guardians or partially raised in a day care center.

| SAMPLE RESPONSE | FREQUENCY | VOCABULARY | CONCRETE |
|---|---|---|---|
| Human being | 6839 | 967 | Concrete |
| Stages | 4969 | 2285 | Abstract |
| Minor | 2117 | 2538 | Abstract |
| Person | 5120 | 583 | Concrete |
| Younger | 2667 | 1784 | Abstract |
| Age | 3603 | 327 | Concrete |
| Relationship | 5697 | 1632 | Concrete |
| Parents | 7930 | 934 | Concrete |
| Sons | 1205 | 467 | Concrete |
| Daughters | 6519 | 483 | Concrete |
| Families | 5365 | 559 | Concrete |
| Raised | 2133 | 1644 | Abstract |
| Day care | 1100 | 2487 | Concrete |
| Human | 3941 | 1196 | Concrete |
| Growth | 3968 | 1045 | Abstract |
| Development | 2684 | 1455 | Abstract |
| Toddler | 5536 | 2498 | Concrete |
| Early | 2524 | 1146 | Abstract |

File  Edit  Tools

Item Development Dashboard

Knowledge Base: Child

Biologically, a child (plural: children) is a human being between the stages of birth and puberty. The legal definition of child generally refers to a minor, otherwise known as a person younger than the age of majority.

Child may also describe a relationship with a parent (such as sons and daughters of any age)[3] or, metaphorically, an authority figure, or signify group membership in a clan, tribe, or religion; it can also signify being strongly affected by a specific time, place, or circumstance, as in "a child of nature" or "a child of the Sixties".[4]

There are many social issues that affect children, such as childhood education, bullying, child poverty, dysfunctional families, child labor, hunger, and child homelessness. Children can be raised by parents, by fosterers, guardians or partially raised in a day care center.

| SAMPLE RESPONSE | FREQUENCY | VOCABULARY | CONCRETE |
|---|---|---|---|
| Human being | 6839 | 967 | Concrete |
| Stages | 4969 | 2285 | Abstract |
| Minor | 2117 | 2538 | Abstract |
| Person | 5120 | 583 | Concrete |
| Younger | 2667 | 1784 | Abstract |
| Age | 3603 | 327 | Concrete |
| Relationship | 5697 | 1632 | Concrete |
| Parents | 7930 | 934 | Concrete |
| Sons | 1205 | 467 | Concrete |
| Daughters | 6519 | 483 | Concrete |
| Families | 5365 | 559 | Concrete |
| Raised | 2133 | 1644 | Abstract |
| Day care | 1100 | 2487 | Concrete |
| Human | 3941 | 1196 | Concrete |
| Growth | 3968 | 1045 | Abstract |
| Development | 2684 | 1455 | Abstract |
| Toddler | 5536 | 2498 | Concrete |
| Early | 2524 | 1146 | Abstract |

FIG. 4

File  Edit  Tools

Item Development Dashboard

Knowledge Base: Pages that link to "Animal"

| | |
|---|---|
| Amphibian | (links \| edit) |
| Aardvark | (links \| edit) |
| Aardwolf | (links \| edit) |
| Anaconda | (links \| edit) |
| Abalone | (links \| edit) |
| Allosaurus | (links \| edit) |
| Armadillo | (links \| edit) |
| Ant | (links \| edit) |
| Bird | (links \| edit) |
| Beaver | (links \| edit) |
| Bear | (links \| edit) |
| Brown bear | (links \| edit) |

| SAMPLE RESPONSE | FREQUENCY | VOCABULARY | CONCRETE |
|---|---|---|---|
| Amphibian | 4866 | 7874 | Abstract |
| Aardvark | 3040 | 8354 | Concrete |
| Aardwolf | 7392 | 9431 | Concrete |
| Abalone | 6487 | 8623 | Concrete |
| Anaconda | 1380 | 4563 | Concrete |
| Antelope | 993 | 3246 | Concrete |
| Allosaurus | 6669 | 9834 | Concrete |
| Armadillo | 1755 | 5632 | Concrete |
| Ant | 4688 | 984 | Concrete |
| Bird | 8312 | 554 | Concrete |
| Beaver | 9927 | 1034 | Concrete |
| Bear | 9304 | 435 | Concrete |
| Brown bear | 2798 | 653 | Concrete |
| Gazelle | 1529 | 8542 | Concrete |
| Horse | 6884 | 763 | Concrete |
| Tiger | 9745 | 853 | Concrete |
| Zebra | 1659 | 652 | Concrete |

FIG. 5

ENHANCED ITEM DEVELOPMENT USING AUTOMATED KNOWLEDGEBASE SEARCH

FIELD OF THE INVENTION

This disclosure relates to the field of systems and methods configured to identify and extract word groups (e.g., a word pair), and a sample answer representing a common category, or high level of pertinence, between each word in the word group by crawling one or more knowledge bases.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: select a word pair and a category, concept, or sample response from a data store; perform a data extraction on a first knowledge base, including an article or content associated with a word in the word pair or a list of articles linking to the category, concept, or sample response; insert words generated from the data extraction into a data store; define a difficulty level for each of the words according to a crawl of difficulty data in a database; and render a GUI displaying the words and the difficulty level for each of the words The above features and advantages of the present invention will be better understood from the following detailed description taken in conjunction with the accompanying drawings.

BRIEF DESCRIPTION OF THE DRAWINGS

FIG. 4 illustrates a non-limiting example interface used within a system for developing responses, or sample responses, from knowledge databases, specifically from knowledge base articles.

FIG. 5 illustrates a non-limiting example interface used within a system for developing items from knowledge databases, specifically from knowledge base articles, specifically from a list of articles available from the knowledge base.

DETAILED DESCRIPTION

Figure 1:
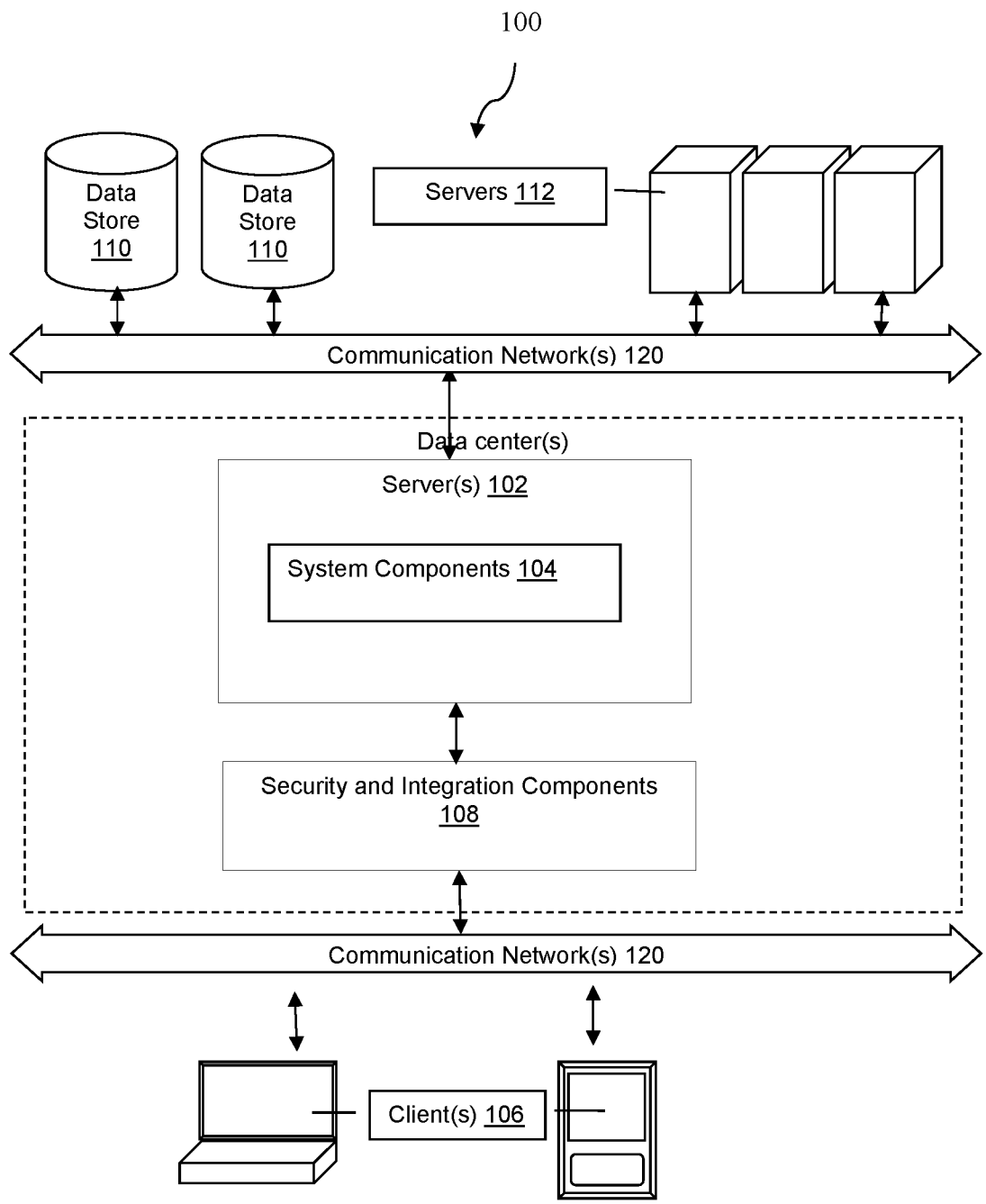
FIG. 1 illustrates a system level block diagram for servers (possibly within a data center), data stores, and clients communicatively coupled to a network used for developing items from knowledge bases.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The Wechsler ability line of products for cognitive assessments includes the Wechsler Adult Intelligence Scale (WAIS), the Wechsler Intelligence Scale for Children (WISC), as well as additional cognitive assessment products, any of which may be used in a variety of clinical assessments. Each of these tests may include a plurality of subtests. As a non-limiting example, one verbal comprehension subtest (referred to as "Similarities" herein) may determine an subject or other subject's understanding of two words by requesting that subjects identify or otherwise infer relationships between a word pair (also referred to herein as items). As non-limiting examples, these relationships may include how the two different words are alike, what category and/or quality both words share, and/or the similarity between two words. Some word pairs are shared concepts underlying an item in certain subtests, and the shared concepts either are the answer to the item itself or otherwise provide the key to correctly answering identification of the relationship between the word pairs in the item.

For example, a subject may be presented the item/word pair Lion-Tiger, and asked to identify the category of, or relationship between these words. A correct response may include "animals." The Similarities subtest may be administered according to a level of difficulty specific to the subject (e.g., the subject's age, ability to solve abstract problems, and/or other demographic) and the administrator of the assessment may then score the response according to the difficulty or complexity within the identified category or relationship. In some embodiments, the Similarities items presented to the subjects may be presented in ascending order of difficulty.

Unlike many other tests or subtests where the correct answer may be readily observed, Similarities provides administrators with a manual of possible or sample responses to be expected by the subject, which administrators use as a guide to judge and score the subject's response during administration of the assessment. At each level of difficulty, the manual of possible responses provides administrators with example responses, also referred to as "sample responses" herein, for each provided item/word pair, to determine whether the responses received by the subject were correct.

The manual is generated by a content development team, referred to as "Development" herein. In creating the manual, Development may generate the word pairs and their respective sample responses, as well as the scoring, difficulty levels and their associated elements (word frequency, vocabulary, level of concreteness or abstractness, subject age, etc.), discontinue rules, and reversal rules for the sample responses, as described below.

Each item within the assessment, as reflected in the manual, may include two fundamental elements, word pairs and sample responses, and Development is responsible for creating both, as well as the scores, difficulty levels, and parallel items associated with the items. The sample responses represent information that Development believes will be given by subjects for each generated word pair, and administrators may refer to these sample responses when administering the Similarities subtest, in order to judge the answer given by the subject in response to the provided word pair. For example, Lion-Tiger may be associated in the manual with a sample response "animal;" Circle-Triangle may be associated with the sample response "shapes;" Saw-Hammer may be associated with the sample response "tools;" Hour-Week may be associated with the sample response "intervals of time," etc.

Development may create the word pairs and sample responses (or parallel items to the word pairs for the sample response, discussed below) via brainstorming and discussion. Development may discuss, write out, or otherwise generate ideas for word pairs, responses, and/or parallel items, which may further involve a pre-step to assigning scoring codes and levels of difficulty, described in more detail below.

After generating the word pairs and sample responses, Development may create a scoring system, assigning a score to each sample response for each of the generated word pairs, which administrators may refer to within the manual when administering the Similarities subtest. As a non-limiting example in the disclosed embodiments, Development may assign 2, 1, or 0 points to each sample response.

In these non-limiting example embodiments, a 2-point response may recognize a shared category, an essential element, and/or a most pertinent similarity between the two words in the word pair. For example, for the word pair Lion-Tiger, Development may assign a 2-point score to the sample responses "animal," "mammal," or "quadruped."

In these example embodiments, a 1-point response identifies a less relevant shared category or similarity between the two words, which still has some essence of being correct. Continuing the example above, for the word pair Lion-Tiger, Development may assign a 1-point score to the sample responses "they're both in the zoo," "fast," or "strong."

In these example embodiments, a 0-point response may be very general or obviously incorrect. Continuing the example above, for the word pair Lion-Tiger, Development may assign a 0-point score to the response "they're both alive," "huge," or "wild."

The range of subjects for which similarities is administered may be wide, representing a cross section of potential subjects. For example, given a sample of a thousand people, one could imagine a bell curve for the group, divided into nineteen segments (as a non-limiting example) according to each segment's ability to identify a correct response for a word pair. In other words, the segments within this curve may range from an "easy" difficulty level, where 999 of 1000 subjects would provide a correct response (e.g., "animal" as a response for the word pair Lion-Tiger), to a "very difficult" or "most difficult" difficulty level, where only 1 person in the group would be able to provide a correct response for the word pair. The range of subjects may also include all segments in between.

Because of the range of subjects for which Similarities is administered, Development's goal is to generate the word pairs and sample responses within the manual in an attempt to meet and target each of the possible segments within the curve for this wide range of difficulties to which the subtest may apply. Development's goal would therefore be to create, and assign a level of difficulty to word pairs and sample responses for each segment within that curve, possibly proceeding from lowest difficulty to highest.

To accomplish this, Development may brainstorm, or otherwise determine what high ability subjects will answer, what middle range ability subjects will answer, what low ability subjects will answer, and so forth. However, selecting a word pair within a shared category at a high ability level may be much more difficult than selecting a word pair with a shared category at a low ability level. This is because at a high ability level, there is a greater limit to the words that have: a high frequency of use and sufficiently low vocabulary level (e.g., "zebras" and "antelopes" are both animals/mammals, but these words are less frequently used than "lions" and "tigers"), but which may also have more abstract meanings.

Thus, in brainstorming the word pairs and sample responses for each of the levels of difficulty, Development may consider: vocabulary levels of both of the subjects and the population generally; the frequency of word usage of the terms, and a degree of word abstraction including the abstract vs. concrete qualities of the word pairs and/or sample responses.

In considering vocabulary levels to determine item difficulty, Development would want to avoid biasing any terms, and thus may further consider that at harder levels of difficulty, out of necessity, the vocabulary levels of the word pairs will increase in difficulty somewhat, but should never become more difficult than those terms that a percentage (e.g., a third) of the population could recognize.

For example, where many subjects may recognize the terms in Lion-Tiger, the term aardvark may be foreign to some people according to age or geography, for example.

Development may further consider the ambiguity and any additional connotations of members in word pairs. For example, in the word pair Saw-Hammer, a saw means both a tool for cutting wood, but also a proverb. Similarly, a hammer may refer to an ear bone, and thus an unintended response may include "related to listening."

In considering the degree of word abstraction including the abstract vs. concrete qualities of the word pairs and/or sample responses to determine item difficulty, Development may consider that typically, the word pairs begin with concrete objects/simple concepts or qualities with a readily identifiable, common, superordinate category or unambiguous shared quality (e.g., animals, forks and spoons—things that you eat, etc.). However, as the items become more difficult, the words and their shared categories and qualities become more abstract.

In some non-limiting example embodiments, Development may consider the age of the subjects in determining item difficulty. For example, Development may try to determine how to generate word pairs and sample responses for each of the 19 segments described above along a defined age range. In this example, one of the assessments may include an adult assessment for subjects ranging from 16 years old to 90. In determining the difficulty level (and discontinue and reversal rules, described below), Development may need to consider factors such as forgetfulness or greater difficulty in reasoning as people get older, which would make it more difficult to reason through more abstract problems. Thus, the different segments or difficulty levels may be further associated with a specific age range.

As Development generates word pairs and sample responses for each of the difficulty levels along the difficulty gradient, some difficulty levels (possibly easier difficulty levels) may have a significant number of items, while other items in more difficult levels have very few. To compensate for these discrepancies and ensure that subjects are evaluated as accurately as possible, Development may create numerous parallel word pairs and/or sample responses or additional word pairs for each category, concept, and/or sample responses in order to have an even distribution across all difficulty levels, possibly increasing in each edition or revision of the manual, as described below.

Parallel items include items that have a similar difficulty and discrimination as the originally generated item. Thus, within each of the difficulty levels, Development may generate one or more parallel items including a word pair at an equivalent level of difficulty for each of the categories or concepts. Parallel items are somewhat easier to create at easier levels of difficulty, simply based on identifying the common category (e.g., common animals, eating utensils, articles of clothing, family members, etc.) and generating additional word pairs. Parallel items are extremely useful for very difficult items, which are very time-consuming to develop.

For example, in the Lion-Tiger word pair example above, Development may generate the parallel items including Cat, Mouse, Camel, Aardvark, Gazelle, etc., because subjects may infer a category or concept of "animal" for both Lion-Tiger and Cat-Mouse, Cat-Camel, Mouse-Camel, etc., because they are all 4 legged, live in the wild, etc.

However, in light of the vocabulary analysis above, Aardvark-Gazelle as a parallel item for Lion-Tiger may be at too high of a difficulty level, as these animals may not be within a generally known vocabulary (e.g., due to age or cultural barriers). Similarly, in light of the concrete/abstract analysis above, the parallel items Lion-Tiger and Mouse-Camel may be at the low difficulty level. Development may require more time to create parallel items at this high level.

One of the important principles in administering an ability or intelligence assessment such as Similarities is to have maximal performance from the subjects throughout. In this context, maximal performance includes having the subjects provide as much examination data as possible, while simultaneously avoiding frustration, fatigue, or embarrassment of the subjects, which may affect their assessment performance and ability to provide the most accurate and complete examination data.

With this in mind, Development may design discontinue rules (which provide safeguards against frustration, fatigue, and embarrassment), into the administration of the subtest, in order to promote maximal performance and effort by the subjects. Development may compose and include instructions for these discontinue rules within the Similarities manual. In short, the discontinue rules discontinue the subtest after a number of consecutive scores of 0. For example, if a subject scores a 0 response for 5 consecutive word pair item responses, the administrator may discontinue the test.

Similar to the discontinue rules, Development may also include one or more reversal rules in the manual. These reversal rules operate around the idea of identifying someone that does not have a high ability in the Similarities subtest according to the number of points missed in the first few questions. For example, if a subject misses any points (i.e., gets anything other than full credit) on one of the first two start points, which are designated as easy difficulty level, they are "reversed back," meaning that because they missed something relatively easy, they should be given items of easier difficulty. Parallel items created by Development may be especially useful here, as these questions may be banked for the creation of parallel forms of a test, allowing for the same subject to be tested twice with a reduced practice effect.

Because development does not know in advance whether the generated word pairs (or parallel items) and sample responses will be effective, and whether the assigned scores, vocabulary levels, difficulty levels, frequency, and/or levels of concreteness/abstractness are accurate, they are required to research via research phases.

An initial edition of the manual to administer the subtest, and used by administrators to collect data, may be published according to Development's educated guesses referred to above, in order to determine the accuracy of the brainstormed ideas. This research phase may include additional research data collected from subjects who were tested according to the initial edition of the manual, including data that Development may have missed or never thought of in the brainstorming phase.

The research edition of the manual may include 2-, 1-, and 0-point sample responses created by Development, which administrators may refer to when administering the Similarities subtest. Each of the sample responses are generated during the research phase prior to the test being administered.

However, despite the manual for administering the Similarities subtest having many examples of 2-, 1-, and 0-point responses to guide administrators during administration, subjects will likely give some answers during data collection that weren't brainstormed or otherwise considered during the initial brainstorming phase. If a subject provides a response that is not in the manual or otherwise provided to the administrator for the research phase, the scoring of that response is left to the administrator's judgement. If subjects provide a marginal response, they are "queried" for further elaboration. The administrator must use the scoring principles to make the judgement call of whether an unscripted subject response is a 2-point, 1-point, or 0 point response, which could potentially result in two qualified administrator's coming to two entirely different conclusions for the same response.

After receiving the results of the research phase, responses may be iteratively reviewed for errors and potential revisions in point value and Development may revise and refine items via repeated trial and error through additional research phases, repeating the steps above.

Thus, as demonstrated above, because administrators and subjects are paid for their time and responses, one of the most substantial and expensive costs in clinical assessment development—in terms of both time and money—is data collection.

Even after the collection of the data, as noted above, there can be conflict in terms of if an administrator scores because of the judgement required—two administrators who may have genuine expertise may come to two different conclusions when scoring a similar response. This conflict of administrator judgement may cost time and money.

Specifically, if administrators incorrectly score too many items as 0-point responses, this will result in the discontinue rules triggering an early termination of the test, further resulting in potential missing data. Cases with missing data may need to be replaced, which increases costs for administrator and subject payment. The project schedule may also be potentially delayed, due to the additional required time for data collection.

In addition, the judgement used by administrators and Development may further include the following set of issues. First, it is difficult and time-consuming to generate word pairs and/or sample responses, resulting in difficulty in scoring during research phases, which in turn causes missed or unnecessary reversals, early or late discontinues during administration, and/or measurement error during scoring and data analysis. It is even more difficult and time-consuming to review verbatim responses to determine which words should be included in the manual. Even a good development team during brainstorming sessions can miss potential word pairs and/or sample responses.

It is also difficult to readily generate word pairs and/or sample responses for a given category of known difficulty, and to estimate in advance the difficulty of a new item or sample response. Specifically, it is difficult to judge the vocabulary difficulty of the words in an item/response, and to judge the concreteness of words in an item/response.

Finally, it is difficult to determine in advance whether any given word pair and/or sample response lends itself well to parallel item creation, and to determine whether many sample responses should have a query associated with them or not. A query may be a neutral probe by the administrator after the subject's initial response, which allows the subject to improve their score.

Thus, what is needed is a more efficient means to generate new word pairs, including a better sense of what the difficulty of those items are, and generate more effective sample responses. The disclosed embodiments include a system comprising a server hardware computing device, coupled to a network and comprising at least one processor executing software instructions within a memory. The system and/or software instructions may include a plurality of software modules, referred to herein as the system, server, software, or bot. This software simplifies the process of authoring Similarities items for cognitive assessments, allowing Development to select and assign scoring point values to generated word pairs and sample answers, rather than guessing at lists of words brainstormed or observed during data collection.

The disclosed embodiments: generate word pairs and sample responses by crawling and analyzing publicly available knowledge bases, described in more detail below (e.g., Wikipedia, Wikidata, Wiktionary, VisualThesaurus, etc.), reducing or otherwise eliminating words within the contents (e.g., articles, prepositions, word cognates, etc.), identifying and extracting related word pairs from the text, and identifying and listing acceptable sample responses, ordered according to difficulty (e.g., basic, less complex, complex).

The disclosed embodiments also generate parallel items by searches of publicly available knowledge bases, reducing words within the contents (e.g., articles, prepositions, word cognates, etc.), identifying and extracting related word pairs from the text, and identifying and listing acceptable parallel items, as an additional list of keywords as candidates for parallel items to an original item.

The disclosed embodiments further resolve the aforementioned issues in item development. Specifically, the disclosed embodiments generate foundations for sample responses for a given category. The foundations for actual 2-, 1-, and 0-point sample responses sample responses are generated and available within the knowledge base articles themselves. The bot copies the content of the articles into a text file or other data storage or temporary memory and automatically edits out unneeded words (of, the, and, because, etc.), ideally with the ability to parse phrases, such as adverb-adjective-noun and adverb-verb combinations.

The software generates items for a given category by giving Development an output file of words within a category, which can be cross-checked against each other for feasibility. Development may then do a quick review of the words and phrases to determine whether any of these phrases would serve as a 2-, 1-, or 0-point response. In addition, once a list of sample responses has been generated, all sample responses and their synonyms (including idioms) and related words can be searched against the verbatim responses generated by subjects during research phases. A simple distribution of actual responses can be categorized by item code, and the program can automatically flag responses that are given more frequently than sample responses, and development can determine whether such responses should replace or supplement the initial sample response.

The disclosed embodiments also estimate the item difficulty in advance. Using abstraction, more abstract word pairs, should have higher difficulty levels, as should their 2-point responses. Specifically, the disclosed embodiments judge vocabulary level by providing Development with approximate vocabulary levels of the words in the output files, and Development can set minimum frequency level. Developers would then select word pairs which seem to be a good fit for an item. Also, the disclosed embodiments judge concreteness. Using bot search results of "list of concrete words" and "list of abstract words" the disclosed embodiments cross-check the proposed word against these lists, and Development is able to estimate how concrete or abstract the proposed word would be.

The disclosed embodiments also determine items which lend themselves well to parallel item creation. Specifically, the bot creates a count of all articles linked to each of its words of the item to be paralleled, as well as all 2-point answers to that item. This can give Development a quick estimate of the number of parallel items that can be created to that item, as well as possible parallel items themselves from the article titles and text.

Finally, the disclosed embodiments determine which sample responses should have a Query. 1- and 0-point sample responses which appear in certain knowledge bases (e.g., a thesaurus or Wiktionary) as a "related word" to a sample response, or which appear in either the word's article or linked articles on knowledge bases such as Wikipedia, may be flagged for possibly adding a query in the program's output file. Words that are listed in a thesaurus as antonyms, however, should also be flagged to NOT be queried.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Figure 2:
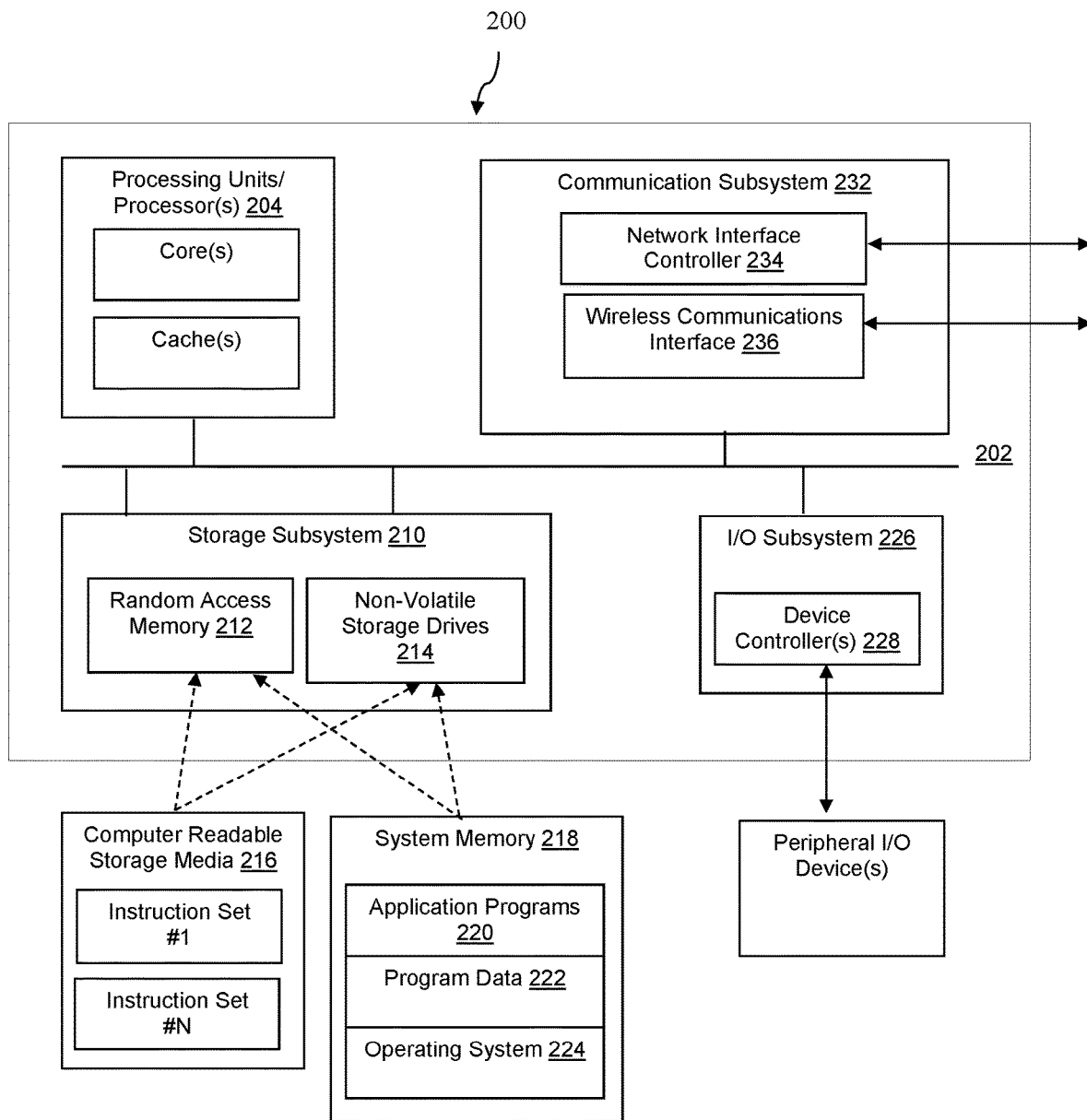
FIG. 2 illustrates a system level block diagram for the detailed components within a hardware computing device used within a system for developing items from knowledge databases.
Figure 3:
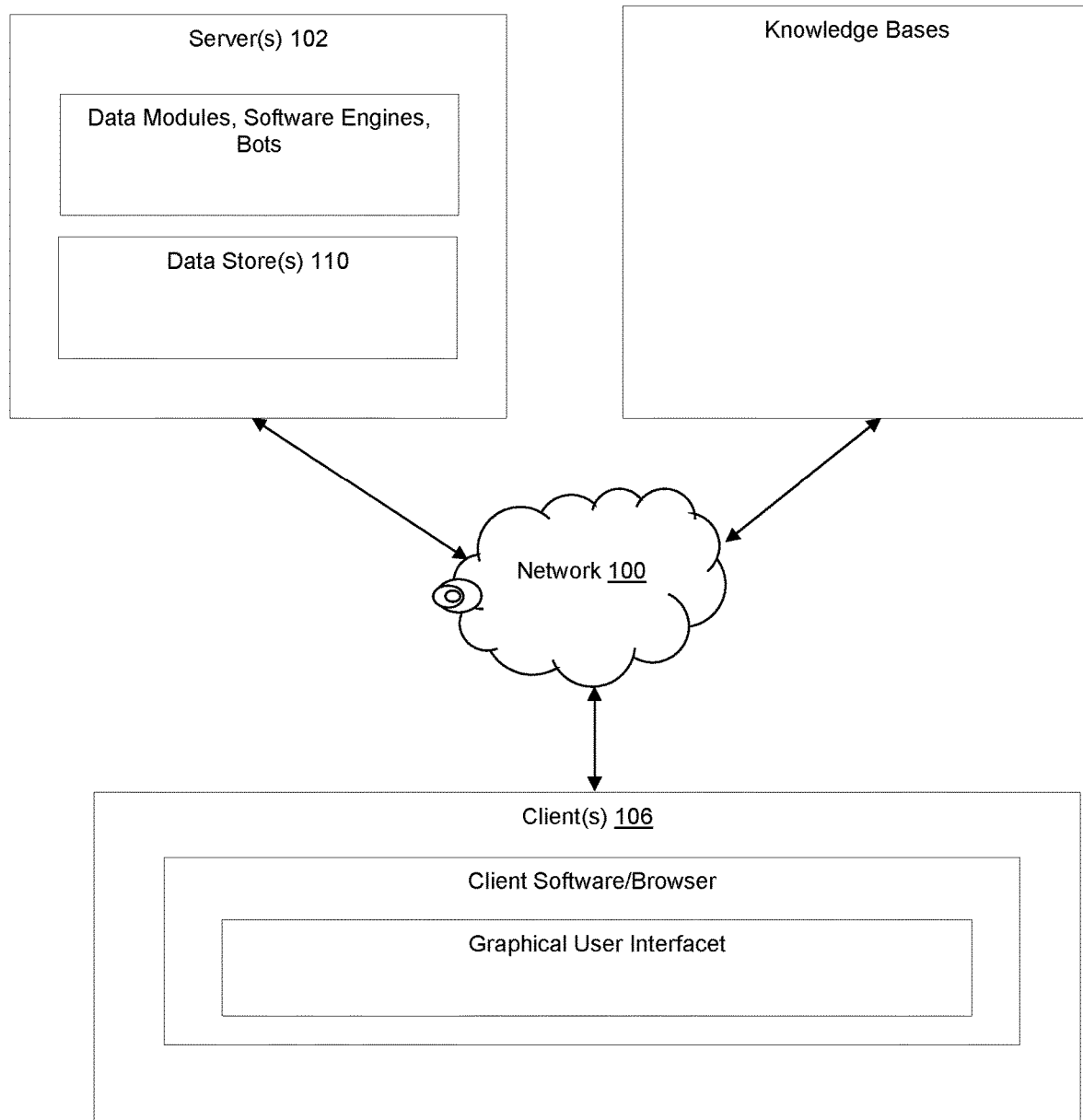
FIG. 3 illustrates a more detailed system level block diagram outlining components within the server(s), client(s), and data store(s) used within a system for developing items from knowledge databases.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments. It should be noted that the embodiments shown in FIGS. 1-2 are examples of a distributed computing systems and are therefore not intended to be limiting.

Any combination of server 102 and/or client 106 may run any combination of computer executable software instructions, executed within the disclosed hardware environment by any combination of software modules including, as non-limiting examples, a word-pair generation engine, any combination of bots, etc. In the interest of simplicity, any combination of this hardware or software may be referred to herein as server 102. Server 102 may create solutions for the issues listed above by crawling one or more knowledge bases in order to accomplish the generation of new items, parallel items, and/or sample responses described herein, as well as use the crawled data to determine the difficulty level, frequency of use, vocabulary level, concreteness/abstractness, etc.

The knowledge bases may include any general compendium of information known in the art which is fit for the purposes of item and sample response development, described herein. Many of these open-source knowledge bases exist. As non-limiting examples, the knowledge bases may include Wikimedia-affiliated knowledge bases that have replaced traditional encyclopedias, such as Wikipedia, Wikidata, and Wiktionary. Additional examples of knowledge bases may include Visual Thesaurus, Watson, etc., or any other third party or proprietary database or other data stores or resources providing insights into word associations. The knowledge bases described herein offer user-written and edited articles and definitions for a variety of words and topics. In some example embodiments, words appearing in a dictionary type knowledge base may be associated with full length articles (e.g., words that appear in Wiktionary linking to full-length Wikipedia articles).

Because these articles are user written, there is a possibility of user error, but many knowledge bases provide safeguards to ensure that the source has been highly vetted and is trusted. First, the collective reading the media within the knowledge bases ensure that the articles pass critical thinking, thereby providing good sourcing. The articles include expertise from subject matter experts, while a group effort improves the articles by cleaning up noise, leaving only the essence of correct understanding of the concept. For example, if users define what a lion is, the knowledge base article reflects not only a single expert's essay on a lion, but also a detailed description including the contributions of several additional authors/users, who may add certain qualities that are important, and may remove those that are unimportant or less important to the article.

Standard layouts may also avoid user error. For example, knowledge bases may have a standard layout introduction section with a broad overview of the subject, then may include additional details, references, etc. For example, the knowledge base may include means to automatically flag certain articles for clean-up for not adhering to quality standards, which makes most of its articles appear in a well-structured and somewhat predictable format.

The knowledge bases also provide a great deal of knowledge about how people naturally associate words, similar to that seen in the Similarities subtest. For example, introductory paragraphs to a subject, as well as "See Also" links for a knowledge base may provide insights from users in trying to ascertain the degree of relationship between two articles, or words.

Some knowledge bases (e.g., Wikipedia) include a "path to philosophy" phenomenon, where a user clicks on the first link in an article, then clicks on the first link in the target article, and repeats this process until the user arrives at the general article on "philosophy." This is likely because, in order to describe an individual concept, a broader context around the concept must be provided, then an even broader one until the user reaches the concept of philosophy which is the concept that encompasses all others.

Some knowledge bases also categorize objects and concepts into categorical hierarchies, and include publicly available metadata regarding the links between articles. For example, publicly available metadata providing data on links to a particular subject may list all articles that link to the article under inspection (e.g., Wikipedia's "What Links Here" functionality). For example, in an article titled "Animal," selecting a link for "what links here" may include all articles for animals that link to the article "Animal." (e.g., articles for tigers, bears, aardvarks, etc. that mention at some point in that article that a tiger, bear, or aardvark is an animal).

Additional knowledge bases may include thesauruses (including, for example, both synonyms and antonyms), dictionaries, other data sources or repositories providing baseline information regarding vocabularies, word frequency and usage knowledge bases, etc.

In addition to crawling the knowledge bases described above, server 102 may provide automation of Development's word pair/parallel item and sample response generation, as well as identification of the associated difficulties, described above. Server 102 may be configured to select an item/word pair, and, for each word in the word pair search any or all of the publicly available knowledge bases for potential word pairs/parallel items and sample responses, as well as the associated difficulty levels.

In order to mine the knowledge bases for generation of items of varying difficulty, server 102 may identify one or more previously generated items consisting of keywords, which may be divided according to 2, 1, or 0 point answers, levels of difficulty, concrete vs. abstract words, age group, etc.

In some embodiments, these previously generated items may be stored in data store(s) 110. Data store(s) 110 may include data records, possibly including information from previously generated items (e.g., existing items in the WAIS- IV). This previously generated information may include any combination of words within word pairs, words and/or data records to which each word in the word pair is associated in the database, a word frequency of each word in the word pair, a vocabulary level associated with each word in the word pair and/or the item made up of the word pair, possibly associated with the word frequency for the word, a level of abstraction for each word in the word pair, possibly associated with the word frequency for that word, 2, 1, and 0-point sample responses associated with each associated word pair, etc., as described herein.

Server 102 may produce sample response output files by crawling the knowledge bases associated with specific key words, copying text from the knowledge base articles, deleting out unnecessary text, and generating an output file, comprising any combination of 2, 1, or 0 point sample responses for any stored or proposed items in an easy to review format.

To accomplish this, for each previously generated item identified in data store 110, server 102 may select each of the words in the word pair, possibly by selecting each data record and identifying the associated word. For each word selected, server 102 may navigate to an article or other web page for that word within one or more of the knowledge bases described above. The reasoning behind navigating to these pages is that authors writing the articles may include information inferred in a similar fashion to the inference made by subjects during Similarities, defining how things are related (e.g., an article on a lion includes details about the category and qualities of a lion, including it being an animal a quadruped, and a mammal, etc.).

Articles or other web pages within the knowledge bases may provide a resource for providing additional sample answers if they are properly searched. As a non-limiting example, server 102 may navigate to one or more articles or other web pages for each of the words in the word pairs of existing items. Server 102 may then crawl each of the articles or web pages navigated to, using any crawling or other data extraction methods known in the art.

Server 102 may then generate or otherwise obtain sample responses for each of the existing word pairs by reviewing article-chains to philosophy from the members of that item's word pair. In order to generate/obtain sample responses for each of the existing items, server 102 may access the article or web page associated in the knowledge base with the selected word, and further select the first link in the article, thereby navigating to the associated article or page. The bot may then repeat this process, creating a review of article-chains to philosophy from the members of that item's word pair to the associated article or web page on Philosophy, as described above. Crawling using this method may prevent the data loss during the research phase, as described above, providing Development with a greater corpus of sample responses.

Server 102 may then select and import the text of the article for each word in the article chains to philosophy. A conducted case study has found that by taking the first sentence in an introductory or broad overview section (e.g., the first paragraph) in a knowledge base article for both members of any word pair, 50% of items have a 2-point response in the first sentence, 67% of items have a 2-point response in first two sentences, 72% of 2-point responses were in at least one of the two article chains to philosophy from one or both members of the word pair, 97% of 1-point responses (or better) were in at least one of the two article chains to philosophy from one or both members of the word pair, and 100% had at least one 0-point response (or better) in the two article chains to philosophy from one or both chains of the word pair.

Thus, for each of the articles navigated to and crawled by server 102 within the article-chain to philosophy associated with identified words in the word pair, server 102 may copy, import, download (e.g., as a text file), and/or otherwise select the text or other content of the article. Server 102 may identify, within the content of the article, a broad overview section, possibly in the first paragraph of the content. Server 102 may then analyze each word in each sentence of the overview section, possibly with particular emphasis on the first sentence of the article. Server 102 may further use the identified content to select the keywords that will generate the word pairs and sample response.

However, before generating a list of identified target words analyzed below and/or presented on a graphical user interface (GUI) or other user interface (e.g., downloaded text file), server 102 may reduce the text of each article or other content by automatically editing out or otherwise eliminating unneeded words, phrases, or other text. In other words, server 102 may do a massive text purge to delete any extraneous words or phrases. As non-limiting examples, these unneeded or extraneous words or phrases may include articles (a, the), prepositions (of), conjunctions (and, or), common verbs (is, are), adverbs/adjectives (bigger, best), simple words (because), the target word (run), cognates of the word being searched (running, ran) etc.

In some embodiments, server 102 may identify and present phrases, such as adverb-adjective-noun and adverb-verb combinations within the text. In these embodiments, server 102 may identify a part of speech (using, for example, the knowledge base wordandphrase.info, which identifies a part of speech associated with words) and link specific parts of speech, such as linking adjectives to the nouns which they immediately precede or adverbs that immediately precede verbs, etc. to create simple phrases, as non-limiting examples.

After purging all unnecessary words, phrases, or other content, and generating phrases in some embodiments, server 102 may organize a list of individual words or phrases, consisting of a long single column of individual words or phrases, so each individual row, or other delimited concept, is a word or phrase. In some embodiments, server 102 may save each of the identified and generated words and/or phrases in data store 110, possibly as individual data records. In some embodiments, each data record for each word or phrase may be flagged, possibly using a specific data field, as a new word and/or proposed sample answer.

Server 102 may also mine the knowledge bases for items, including potential new items and potential parallel items within an existing item's concept or category, or possibly associated with 2-point responses. To accomplish this, server 102 may identify, within data store 110, one or more previously generated sample responses and/or other concepts or categories, which may have been previously divided according to 2, 1, or 0 point answers, levels of difficulty, vocabulary level, word frequency, concreteness vs. abstractness, etc. As a non-limiting example, server 102 may identify "animal" as a category, concept and/or 2-point sample response associated with the word pair Lion-Bear.

Using this selected category, concept, or 2-point answer, server 102 may crawl the publicly available metadata within the knowledgebase to identify titles for articles which link to the articles or other content related to the identified category, concept, or 2-point answer within the knowledge base hierarchy. Using this data, server 102 may generate one or more output files including a list of one or more potential new and/or parallel words for word pairs, for review by Development. After crawling the knowledge bases, server 102 may copy text from the list of articles associated with the category, concept, and/or sample answers, delete out unnecessary text, and generate the output file, comprising any combination of new or parallel words for word pairs.

In some embodiments, server 102 may identify and select each data record and term representing its associated category, concept, and/or sample response. For each keywords identified, server 102 may navigate to or otherwise crawl the knowledge base metadata identifying lists of titles and/or links to articles associated with the identified keyword (e.g., via Wikipedia's "what links here" functionality). As above, server 102 may eliminate unnecessary words. However, for new or parallel word pairs, in addition to deleting the unnecessary items above, server 102 may also delete out unnecessary text from users in knowledge bases such as VisualThesaurus. These resources may include usernames and comment data (e.g., a user posting articles discussing the meaning of a word or whether or not it needs to be redefined, opinions about an article or post, etc.). This information may also be purged from the selected text and/or text file. Server 102 may then generate a list of individual words and/or phrases, using techniques similar to those described above.

As noted above, server 102 may navigate or otherwise access metadata for a list of titles for knowledge base articles or other content for each of the words in the word pairs of existing items. Server 102 may then crawl the content of this list of titles, using any crawling or other data extraction methods known in the art. Server 102 may simply scan the data within the list and create target words for new or parallel word pairs. Server 102 may again search article chains to philosophy from potential target words within the list of articles or other content, to the Philosophy article for common chains which may include alternative 2-point answers. For example, in following the article chain to philosophy for "animal," server 102 may identify the following two article chains: Lion→Carnivore→Animal . . . Tiger→Carnivore→Animal, etc. Because these two article chains share common paths to the article (i.e., to "carnivore" as well as the longer chain to "animal"), each chain should be considered as affecting difficulty when creating a parallel item to "Lion-Tiger."

As an alternative, server 102 may access thesaurus based knowledge bases (e.g., ThinkMap, VisualThesaurus) to generate parallel items. These thesaurus-based knowledge bases may have a drill-down style of navigation, wherein a user selects a concept (or, in the disclosed embodiments, server 102 accesses publicly available data using an identified category, concept, or 2-point sample response) and at each level of the drill down, is presented with several equivalent words. Server 102 may identify these words, and generate a list of potential new or parallel target words, using techniques similar to those disclosed above.

Thus, server 102 uses the knowledge bases' metadata or other publicly available data to create new or parallel word pairs. After purging all unnecessary words, phrases, or other content, server 102 may organize a list of individual words or phrases, consisting of a long single column of individual words or phrases, so each individual row is a word or phrase. In some embodiments, server 102 may save each of the identified and generated words and/or phrases in data store 110, possibly as individual data records. In some embodiments, each the data record for each word or phrase may be flagged, possibly using a specific data field, as a new and/or proposed sample answer.

Once server 102 generates new sample responses, or new target or parallel words for word pairs, server 102 may determine the difficulty associated with these newly created and stored items, according to word frequency, vocabulary level, and/or concreteness/abstractness.

One method used by the server to determine word frequency includes crawling each of the articles in the list of articles identified from the categories, concepts, and/or 2-point answers. Server 102 may crawl each of the articles in the article chain to philosophy and retrieve the number of pages that link to those articles for an estimate of popularity/familiarity of these topics. Server 102 may also search word frequency ranking databases for single-word articles, and combine results in order to yield a predefined number of potential target words. In some embodiments, developers can set minimum frequency levels as a parameter in the search. Server 102 may further create a count of all articles linked to each of its words of the item to be paralleled, as well as all 2-point answers to that item, thereby providing developers with a quick estimate of the number of parallel items that can be created to that item, as well as possible parallel items themselves from the article titles and text.

As an additional resource, server 102 may access and/or cross-reference a frequency of the new words, categories, and/or concepts against publicly available databases (e.g., WordAndPhrase.info and Google Ngram Viewer) to determine which words were used often enough to be well-known, and thereby determine the frequency of use and/or vocabulary level of each of the words in the new items, and flag potentially difficult words. For example, Wordandphrase.info may provide insights into an overall usage frequency in spoken & written formats, and Google's Ngram chart may provide insights into the percentage of times that particular words appear in written form.

As noted above, word frequency data may be further used in determining difficulty through vocabulary level. Additional vocabulary or other word frequency databases may also be used. As non-limiting examples, databases such as WordAndPhrase.info may provide vocabulary level indicating a usage level of various vocabulary words.

Words that are obtained in this manner may then be checked to ensure that they are of a sufficiently low vocabulary level. For example, server 102 may execute a word frequency search by accessing publicly available data from such databases, and identify words with poor frequency rankings (>5000), which may be flagged in data store 110 as possibly being too high vocabulary for the construct being measured. The disclosed system may therefore give developers approximate vocabulary levels of the words in the output files, thereby solving the issue of judging vocabulary level of generated items and sample responses.

As noted above, the difficulty level for generated words in word pairs and/or sample responses may be determined according to a degree of concreteness or abstraction for the items. Server 102 may analyze the new items by searching the associated words and comparing the words in any of the new items with lists of abstract and concrete words to give an approximate level of concreteness and abstraction, and by extension, item difficulty.

In some embodiments, and as a non-limiting example of how this may be accomplished, server 102 may access a search engine (e.g., Google search) to obtain links to the first 100 websites with lists of abstract words, then may obtain the links to the first 100 websites with lists of concrete words. Server 102 may then crawls these 200 sites and count the number of times that the words in each word pair appear.

The sites in which each word appears may then be captured and stored in data store 110 for Development review for context.

This approach may overcome the issues of judging concreteness and estimating item difficulty in advance discussed above. Words that are more abstract should appear more often than other words in the abstract word list website than the concrete, and vice versa. Using the results from the list of concrete words and the list of abstract words and cross-checking the proposed word against these lists, Development may estimate how concrete or abstract the proposed word would be. Further, using abstraction, more abstract word pairs, should have higher difficulty levels, as should their 2-point responses.

Regarding the issue of determining which sample responses should have a query, 1 and 0 point sample responses which appear in a thesaurus or other knowledge bases as a "related word" to a sample response, or which appear in either the word's article or linked articles on Wikipedia, may be flagged for possibly adding a query in the program's output file. Words that are listed in a thesaurus as antonyms, however, should also be flagged to not be queried. Similarly, article chains to philosophy that do not include common items within the chain (see the Lion→Tiger example above), should also not be flagged to be queries.

As a non-limiting example, using a taxonomy within a knowledge base, a tiger may be listed as a carnivore, a mammal, and an animal, which are at various levels within the taxonomy. Server 102 may search for alternative categories that aren't included in an original item pair (e.g., Lion-Tiger, Bear-Cat). Server 102 may be configured to examine the back end taxonomy data to only search for mammals, animals, etc. If anything else is found, server 102 may flag this, determining, for example, that the taxonomy includes carnivores, which were not initially searched for. Server 102 may flag this and display information to Development, that they need to make an internal judgement whether to keep the flagged item, or focus exclusively on items that are only identified as mammals and animals, in this example.

After the target and parallel words and sample responses have been generated and stored, Server 102 may generate a GUI to display the generated words. Server 102 may also provide the results of the output file. Development may then review the new items and sample responses to determine whether any of these items and/or sample responses should be scored as 2, 1, or 0 point responses.

In the non-limiting example embodiment in FIG. 4, Server 102 has selected, from data store 110, one or more data records associated with the word pair Child-Infant, and is executing instructions to automatically generate a list of potential sample responses. Server 102 has then identified an article within a knowledge base, and has crawled the contents of the article, and eliminated all nonessential words from the text. Server 102 has then generated a list of the remaining words, and stored those words as data records within data store 110. Server has then analyzed each of these words for a difficulty level, and has stored the relevant data with the associated generated words in data store 110. For example, crawling the appropriate knowledge bases, server 102 has determined a word frequency, vocabulary level, and concreteness/abstractness of each generated and stored word. Server 102 has then selected those data records flagged as new within data store 110, and displayed them on the GUI shown in FIG. 4.

In the non-limiting example embodiment in FIG. 5, Server 102 has selected, from data store 110, one or more data records associated with the category/concept/2-point sample response "Animal," and is executing instructions to automatically generate a list of potential new words or parallel words. Server 102 has then accessed the publicly available metadata from a knowledge base, and has accessed the list of articles or other content that link to "Animal." Server 102 has then crawled the contents of the list of articles, and eliminated all nonessential words from the text. Server 102 has then generated a list of the remaining words, and stored those words as data records within data store 110. Server has then analyzed each of these words for a difficulty level, and has stored the relevant data with the associated generated words in data store 110. For example, crawling the appropriate knowledge bases, server 102 has determined a word frequency, vocabulary level, and concreteness/abstractness of each generated and stored word. Server 102 has then selected those data records flagged as new within data store 110, and displayed them on the GUI shown in FIG. 4.

In some embodiments (not shown), server 102 may generate an additional GUI, allowing users (possibly within Development) to assign 2, 1, or 0 point values with the items, indicating a score for the item, and/or to associate the new words and/or sample answers with one another or with already-existing items to create various additional parallel items and/or sample answers.

Figure 6:
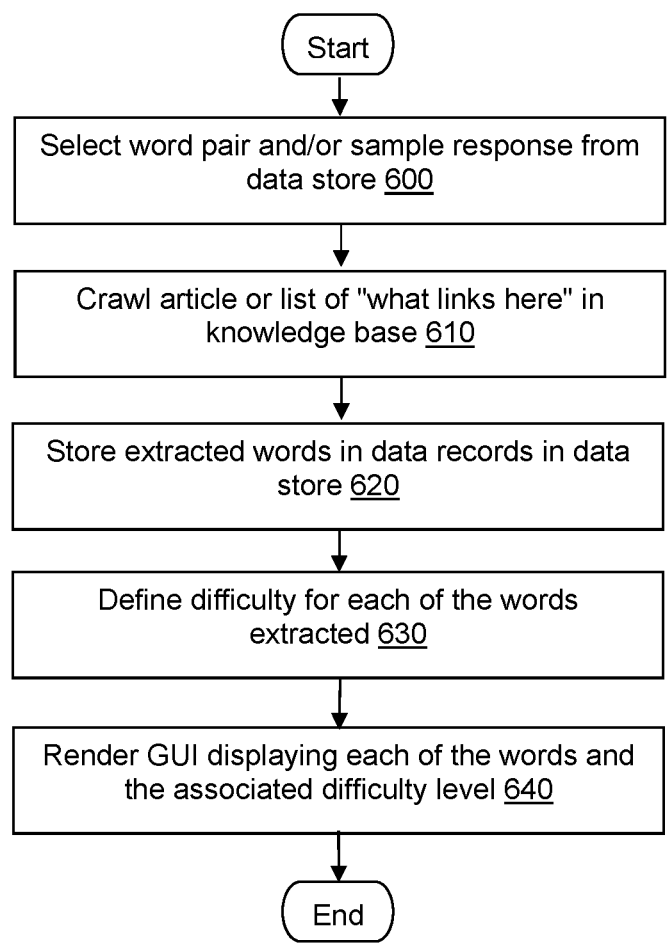
FIG. 6 illustrates a flow diagram representing the method steps executed by a system for developing items from knowledge databases.

FIG. 6 is an example embodiment representing the method steps executed by a server hardware computing device 102 coupled to a network 120 and comprising at least one processor executing instructions within a memory. In step 600, server 102 execute a first database command selecting from a data store: 110 a first at least one data record associated with a word pair; and a second at least one data record associated with a category, concept, or sample response; In step 610, server 102 performs a data extraction within a first knowledge base comprising: an article or content associated in the first knowledge base with a word in the word pair; and a list of article titles linking to the category, concept, or sample response; In step 620, server 102 executes a second database command inserting, into the data store 110, a data record for each of a plurality of words generated from the data extraction; In step 630, server 110 defines a difficulty level for each of the plurality of words in the data extraction according to a crawl of difficulty data within a database; and in step 640, server 102 renders a graphical user interface (GUI) displaying each of the plurality of words, and the difficulty level for each of the plurality of words.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising a server hardware computing device coupled to a network and comprising at least one processor executing instructions within a memory which, when executed, cause the system to:

execute a first database command selecting from a data store:
　a first at least one data record associated with a word pair; and
　a second at least one data record associated with a category, concept, or sample response;
perform a data extraction within a first knowledge base comprising:
　an article or content associated in the first knowledge base with a word in the word pair; and
　a list of article titles linking to the category, concept, or sample response;
execute a second database command inserting, into the data store, a data record for each of a plurality of words generated from the data extraction;
define a difficulty level for each of the plurality of words in the data extraction according to a crawl of difficulty data within a database;
render a graphical user interface (GUI) displaying each of the plurality of words, and the difficulty level for each of the plurality of words.

2. The system of claim 1, wherein the word in the word pair is stored in the data store in association with a second word in the word pair, and the word pair is stored in the data store in association with a common category, concept, or sample response.

3. The system of claim 1, wherein the sample response is stored in the data store in association with:
　the first word and a second word stored in a data record in the data store; and
　a 2 point score, a 1 point score, or a 0 point score indicating whether the first word and the second word share a shared category, an essential element, or a pertinent similarity.

4. The system of claim 3, wherein:
　the 2-point score indicates a relevant shared category, an essential element, and/or a most pertinent similarity between the first word and the second word in the word pair;
　the 1-point score indicates a less relevant shared category or similarity between the first word and the second word; and
　the 0-point score indicates a general correlation between the first word and the second word.

5. The system of claim 1, wherein the list of article titles from the data extraction are accessed using a publicly-accessible metadata available from the first knowledge base.

6. The system of claim 1, wherein the difficulty level is defined according to a word frequency of each of the plurality of words, according to a word frequency knowledge base.

7. The system of claim 1, wherein the difficulty level is defined according to a vocabulary level of each of the plurality of words, according to a word frequency database.

8. The system of claim 1, wherein the difficulty level is defined according to a level of abstractness or concreteness of each of the plurality of words, according to an abstractness or concreteness knowledge base.

9. The system of claim 1, wherein the GUI accepts user input associating a score for each of the plurality of words.

10. The system of claim 9, wherein the score is stored in association with each of the plurality of words in a data store.

11. A method comprising:
executing, by a server hardware computing device coupled to a network and comprising at least one processor executing instructions within a memory, a first database command selecting from a data store:
　a first at least one data record associated with a word pair; and
　a second at least one data record associated with a category, concept, or sample response;
performing, by the server hardware computing device, a data extraction within a first knowledge base comprising:
　an article or content associated in the first knowledge base with a word in the word pair; and
　a list of article titles linking to the category, concept, or sample response;
executing, by the server hardware computing device, a second database command inserting, into the data store, a data record for each of a plurality of words generated from the data extraction;
defining, by the server hardware computing device, a difficulty level for each of the plurality of words in the data extraction according to a crawl of difficulty data within a database;
rendering, by the server hardware computing device, a graphical user interface (GUI) displaying each of the plurality of words, and the difficulty level for each of the plurality of words.

12. The method of claim 11, wherein the word in the word pair is stored in the data store in association with a second word in the word pair, and the word pair is stored in the data store in association with a common category, concept, or sample response.

13. The method of claim 11, further comprising the step of storing, by the server hardware computing device, the sample response in the data store in association with:
　the first word and a second word stored in a data record in the data store; and
　a 2 point score, a 1 point score, or a 0 point score indicating whether the first word and the second word share a shared category, an essential element, or a pertinent similarity.

14. The method of claim 13, wherein:
　the 2-point score indicates a relevant shared category, an essential element, and/or a most pertinent similarity between the first word and the second word in the word pair;
　the 1-point score indicates a less relevant shared category or similarity between the first word and the second word; and
　the 0-point score indicates a general correlation between the first word and the second word.

15. The method of claim 11, further comprising the step of accessing, by the server hardware computing device, the list of article titles from the data extraction using a publicly-accessible metadata available from the first knowledge base.

16. The method of claim 11, further comprising the step of defining, by the server hardware computing device, the difficulty level according to a word frequency of each of the plurality of words, according to a word frequency knowledge base.

17. The method of claim 11, further comprising the step of defining, by the server hardware computing device, the difficulty level according to a vocabulary level of each of the plurality of words, according to a word frequency database.

18. The method of claim 11, further comprising the step of defining, by the server hardware computing device, the difficulty level according to a level of abstractness or concreteness of each of the plurality of words, according to an abstractness or concreteness knowledge base.

19. The method of claim 11, further comprising the step of accepting, by the GUI, user input associating a score for each of the plurality of words.

20. The method of claim 19, wherein the score is stored in association with each of the plurality of words in a data store.

* * * * *